3,699,102
PRODUCTION OF UREIDOMETHYLPHOSPHONYL HALIDES

Harro Petersen, Frankenthal, Germany, assignor to Badische Anilin- & Soda-Fabrik Aktiengesellschaft, Ludwigshafen (Rhine), Germany
No Drawing. Filed Dec. 15, 1969, Ser. No. 885,376
Int. Cl. C07d 51/18
U.S. Cl. 260—251 P          2 Claims

ABSTRACT OF THE DISCLOSURE

The production of heterocyclic ureidomethylphosphonyl halides such as the compound

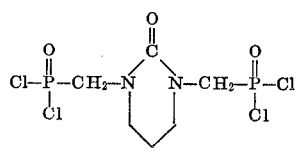

by reaction of urea compounds with phosphorus trihalides and the new ureidomethylphosphonyl halides themselves. The new products are flame retardants for surface coating agents and plastics and are valuable starting materials for many syntheses, particularly for the production of flame retardants, auxiliaries in the surface coating and plastics field, plants protection agents and dyes.

---

The invention relates to a process for the production of halides of ureidomethylphosphonic acid by reaction of urea compounds with phosphorus trihalides, and new substances of this type.

An object of this invention is a new process for the production of a large number of ureidomethylphosphonyl halides in good yields and high purity by a simple method.

Another object of this invention is the new ureidomethylphosphonyl halides themselves.

These and other objects are achieved and ureidomethylphosphonyl halides having the general formula:

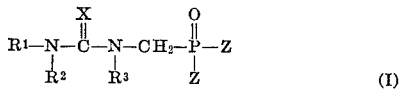

where the individual radicals $R^1$, $A^2$ and $R^3$ may be identical or different and each denotes an aliphatic, cycloaliphatic, araliphatic or aromatic radical, or the radicals $R^2$ and $R^3$, or the radicals $R^2$ and $R^3$ together with the adjacent ureido group, may be members of a heterocyclic ring, $R^1$ may also denote the radical:

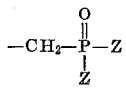

Z denoting a halogen atom and the radical X denoting an oxygen atom or a sulfur atom, are advantageously obtained by reacting a urea compound having the general formula:

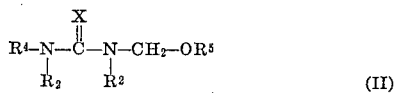

where the radicals $R^2$, $R^3$ and X have the above meanings, $R^4$ denotes an aliphatic, cycloaliphatic araliphatic or aromatic radical or the radical —$CH_2$—$OR^5$ and $R^5$ denotes a hydrogen atom or an aliphatic radical, with a phosphorus trihalide having the general formula:

where Z has the meanings given above.

If N-methyl-N′-methoxymethylhexahydropyrimidone-2 and phosphorus trichloride are used, the reaction may be represented by the following equation:

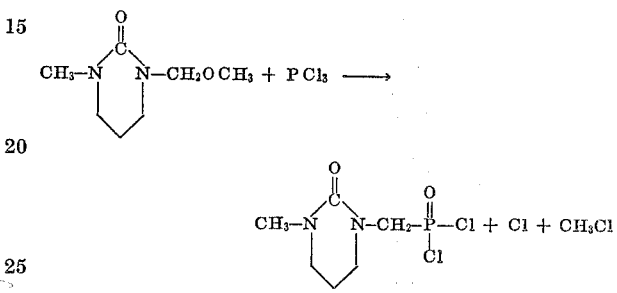

The process according to the invention yields, surprisingly, a large number of the new ureidomethylphosphonyl halides in good yields and high purity in a simple way.

N-methylolurea, N,N′-dimethylolurea, N-alkoxymethylurea, N,N′-dialkoxymethylurea and N-methylol-N′-alkoxymethylurea compounds having the general Formula II are used as starting materials. Similarly, urea compounds which are substituted on one of the two nitrogen atoms by a methylol group or an alkoxymethyl group and on the other of the two nitrogen atoms by a different alkoxymethyl group, for example N-methylol-N′-methoxymethylpropylenurea, may also be used. Preferred starting materials (II) and consequently preferred end products (I) are those in whose Formulae $R^1$, $R^2$, $R^3$ and $R^4$ may be identical or different, and each denotes an alkyl radical having 1 to 12, particularly 1 to 6, carbon atoms, a cycloalkyl radical having 5 to 7 carbon atoms, an aralkyl radical having 7 to 12 carbon atoms, a phenyl radical or a naphthyl radical, the radicals $R^2$ and $R^3$, or the radicals $R^2$ and $R^3$ together with the adjacent ureido group, may also be members of a five-membered or six-membered heterocyclic ring which may contain another nitrogen atom or an oxygen atom as members of the ring in addition to the two nitrogen atoms, $R^1$ may also denote the radical:

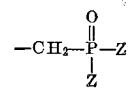

and/or $R^4$ may denote the radical $CH_2OR^5$, $R^5$ denoting a hydrogen atom or an alkyl radical having 1 to 12, particularly 1 to 7, carbon atoms, Z denoting a chlorine atom or a bromine atom and the radical X denoting an oxygen atom or a sulfur atom. The said radicals or the heterocyclic ring may also bear, as substituents, groups and/or atoms which are inert under the reaction conditions, for example alkyl radicals having 1 to 6 carbon atoms.

Thus the following urea compounds may be used as starting materials:

N,N'-dimethylolethyleneurea,
N,N'-dimethylolpropyleneurea,
N,N'-dimethylol-5,5-dimethylpropyleneurea,
N,N'-dimethylolethylenethiourea,
N-methyl-N'-methylolpropyleneurea,
N-ethyl-N'-methylolethyleneurea,
N,N'-dimethoxymethylethyleneurea,
N,N'-diethoxymethylethylenethiourea,
N,N'-dimethoxymethylpropyleneurea,
N,N'-diisopropoxymethylpropyleneurea,
N,N'-dimethoxymethyl-5,5-dimethylpropyleneurea,
N,N'-dimethoxymethyltetrahydro-1,3,5-oxadiazinone-(4),
N-methyl-N'-methoxymethyltetrahydro-1,3,5-oxadiazinone-(4),
N-methyl-N'-methoxymethylethyleneurea,
N-methyl-N'-methoxymethylpropyleneurea,
N-cyclohexyl-N'-methylol-N,N'-dimethylurea,
N-cyclopentyl-N'-methylol-N,N'-dimethylurea,
N-benzyl-N'-methylol-N,N'-dimethylurea,
N-phenyl-N'-methylol-N,N'-dimethylurea, and
N-naphthyl-N'-methylol-N,N'-dimethylurea.

Phosphorus trihalides, generally phosphorous trichlorides or tribromides, having the general Formula III are used as other starting materials and are reacted with the starting materials (II) in a stoichiometric amount or in an excess, for example in a ratio of 1 to 4 moles of starting material (III) to one radical of —CH$_2$OR$^5$ of 1 mole of starting material (II) or 2 to 8 moles with reference of two radicals —CH$_2$OR$^5$ of 1 mole of starting material (II). When the starting material (II) has a radical —CH$_2$OR$^5$ on each of the two nitrogen atoms, the reaction may be carried out in two stages, for example by first reacting one radical with the stoichiometric amounts of phosphorus trihalide (III) and then reacting the resultant ureidomonomethylphosphonyl halide (with or without previous separation from the reaction mixture) with a stochiometric or excessive amount of starting material (III) to form an end product (I) having two methylphosphonyl halide groups.

The reaction is usually carried out at a temperature of from —10° to +100° C., preferably at from 20° to 70° C., at atmospheric or superatmospheric pressure, and continuously or batchwise. It is advantageous to use an organic solvent which is inert under reaction conditions such as an ether, for example diethyl ether, dioxane or tetrahydrofuran; a chlorohydrocarbon, for example tetrachloromethane or trichloroethane; or mixtures of the same.

The reaction may be carried out as follows: the starting material (II) (or (III)), with or without a solvent, is slowly added over a period of from 5 to 60 minutes to starting material (III) (or (II)) with or without a solvent; the mixture is kept at the reaction temperature, and then cooled. The end product (I) is then separated from the reaction mixture by a conventional method, for example by filtration and drying. When the reaction mixture is in two phases, the phase containing the end product may be separated and the end product isolated therefrom by an analogous method; if desired the solvent may be distilled off from the phase and the residue allowed to stand until the end product crystallizes.

The new compounds which can be prepared by the process according to this invention are flame retardants for surface coating agents and plastics and valuable starting materials for numerous syntheses, particularly for the production of flame retardants, auxiliaries in the field of surface coating agents and plastics, pesticides and dyes. For example a cellulose fabric may be impregnated with a treatment liquor containing from 150 to 200 g./liter of a cycloureido-N,N'-dimethylphosphonyl chloride in aqueous ammonia solution, squeezed out to a liquor pickup of 80 to 90% and dried; it is thus given a flameproof finish. The new ureidomethylphosphonyl halides may be reacted with water to give the corresponding phosphonic acids; with monofuctional or bifunctional alcohols, for example methanol, ethanol, octanol, hexachloroisopropenol, dibromopropenol, allyl alchol, ethylene glycl, propylene glycol, 1,3-propanediol to form the corresponding acyclic or cyclic O-esters; with ammonia or a primary or secondary amine, for example methylamine, piperidine, cyclohexylamine, dimethylamine, N-methylaniline to give the corresponding amide. The reaction of the ureidomethylphosphonyl dihalides with the said substances is carried out in an at least equimolar ratio and generally a base, for example a tertiary amine, is added to bind the hydrogen halide liberated. This reaction may also be carried out in the inert organic solvent. In many cases it is not necessary in such reactions to separate the end product (I); the reaction mixture obtained by the process according to the invention may be used direct for the said reactions without separating the end product (I).

Preferred end products are ureidomethylphosphonyl halides having the general formula:

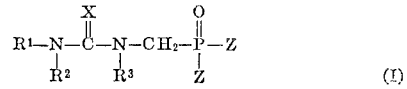

where the individual radicals $R^1$, $R^2$ and $R^3$ may be identical or different and each denotes an alkyl radical having 1 to 12, particularly 1 to 6, carbon atoms, a cycloalkyl radical having 5 to 7 carbon atoms, an aralkyl radical having 7 to 12 carbon atoms, a phenyl radical or a naphthyl radical, the radicals $R^2$ and $R^3$, or the radicals $R^2$ and $R^3$ together with the adjacent ureido groups, may also be members of a five-membered or six-membered heterocyclic ring which may contain (in addition to the two nitrogen atoms) another nitrogen atom or an oxygen atom as ring members, and/or $R^1$ may also denote the radical:

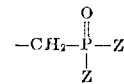

Z denoting a chlorine atom or a bromine atom and the radical X denoting an oxygen atom or a sulfur atom.

Examples of these end products are:

2 - oxohexahydropyrimidyl-N,N'-di-(methylphosphonyl dichloride),
2 - thionohexahydropyrimidyl - N,N' - di-(methylphosphonyl dichloride) and the corresponding dibromide,
2 - oxoimidazolidinyl - N,N' - di-(methylphosphonyl dichloride),
N - methylimidazolidinyl - N'-methylphosphonyl dibromide.

The following Examples illustrate the invention. The parts given in the Examples are parts by weight.

EXAMPLE 1

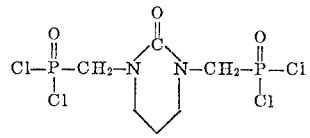

94 parts of N,N'-dimethoxymethylpropyleneurea is dissolved in 200 parts of ether. 138 parts of phosphorus trichloride is added in portions and while stirring to this solution in a stirred vessel, the temperature of the reaction mixture being kept at about 20° C. by cooling. After the whole has been stirred for about one hour, the lower phase of the mixture is separated and the ether contained therein is distilled off. The syrupy residue is triturated with about 50 parts of trichloroethane and allowed to stand for one day at 0° C. The end product which has crystallized out is filtered off and dried with complete exclusion of moisture. 102 parts (56.3% of the theory) of propyleneurea - N,N'-bis-(methylphosphonyl dichloride) is obtained. Melting point: 150° to 170° C. with decomposition.

*Analysis.*—Calcd. for C₆H₁₀O₃N₂P₂Cl₄ (362) (percent): C, 19.9; H, 2.76; O, 13.3; N, 7.2; P, 17.1; Cl, 39.2. Found (percent): C, 19.8; H, 3.0; O, 12.9; N, 7.3; P, 17.3; Cl, 38.8.

EXAMPLE 2

244 parts of N,N'-diisopropoxymethylpropyleneurea dissolved in 200 parts of 1,1,1-trichloroethane is added in portions over a period of ten minutes with effective cooling to a mixture of 275 parts of phosphorus trichloride and 300 parts of 1,1,1-trichloroethane in a stirred apparatus having reflux condenser. The temperature is kept at 50° to 55° C. by cooling. The reaction mixture is then processed as described in Example 1 and 230 parts (80% of the theory) of propyleneurea-N,N'-bis-(methylphosphonyl dichloride) having a melting point of 150° to 160° C. (with decomposition) is obtained.

EXAMPLE 3

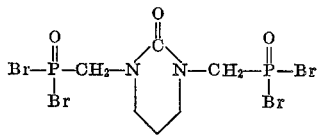

271 parts of phosphorus tribromide is added in portions, while cooling and stirring, to a mixture of 94 parts of N,N'-dimethoxymethylpropyleneurea and 250 parts of trichloroethane in a stirred vessel. The reaction temperature is kept at from 40° to 45° C. After stirring for one hour, the reaction mixture is cooled to 0° to 5° C. and, after having been allowed to stand for a short time, the crystalline propyleneurea-N,N'-bis(methylphosphonyl dibromide) formed is filtered off while excluding moisture and washed with a small amount of cold trichloroethane. 210 parts (78% of the theory) of end product is obtained. Melting point: 250° to 255° C. with decomposition.

*Analysis.*—Calcd. for C₆H₁₀O₃N₂P₂Br₄ (540) percent: C, 13.35; H, 1.85; O, 8.9; N, 5.2; P, 11.5; Br, 59.2. Found (percent): C, 13.2; H, 1.8; O, 8.7; N, 5.0; P, 12.0; Br, 58.8.

EXAMPLE 4

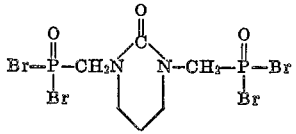

94 parts of N,N'-dimethylolpropyleneurea is added in portions to a solution of 271 parts of phosphorus tribromide in 300 parts of trichloroethane while stirring and cooling. The temperature of the reaction mixture is kept at 35° to 40° C. After the mixture has been stirred for one hour at 35° to 40° C., it is cooled to room temperature and the crystalline end product formed is filtered off with exclusion of moisture and dried. 165 parts (61% of the theory) of propyleneurea-N,N'-bis-(methylphosphonyl dibromide) is obtained. Melting point: 250° to 255° C. with decomposition.

*Analysis.*—Calcd. for C₆H₁₀O₃N₂P₂Br₄ (540) (percent): C, 13.35; H, 1.85; O, 8.9; N, 5.2; P, 11.5; Br, 59.2. Found (percent): C, 13.4; H, 1.76; O, 8.8; N, 5.2; P, 11.2; Br, 59.0.

EXAMPLE 5

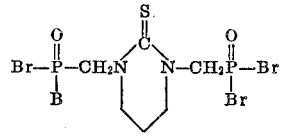

19 parts of N,N'-dimethoxymethylethylenethiourea is suspended in 200 parts of trichloroethane in a stirred vessel. 54 parts of phosphorus tribromide is added in portions while stirring, the reaction temperature being kept at 40° to 50° C. by cooling the reaction mixture. The end product begins to crystallize out from the solution after a few minutes. After having been allowed to stand for several hours at room temperature, the product is filtered off while excluding moisture and dried. 48 parts (89% of the theory) of ethylenethiourea-N,N'-bis (methylphosphonyl dibromide) is obtained. Melting point: 165° C. with decomposition.

*Analysis.*—Calcd. for C₅H₈O₂N₂P₂SBr₄ (542) (percent): C, 11.1; H, 1.48; O, 5.9; N, 5.17; P, 11.45; S, 5.9; Br, 59.0. Found (percent): C, 10.9; H, 1.6; O, 6.0; N, 5.0; P, 11.2; S, 6.0; Br, 58.6.

EXAMPLE 6

70 parts of phosphorus trichloride is added in portions and at 40° to 50° C. to a mixture of 110 parts of N-phenyl-N'-methoxymethylpropyleneurea in 1,000 parts of 1,1,1-trichloroethane while stirring and cooling. After the mixture has been heated at 50° C. for one hour, about 500 parts of the solvent in the mixture is evaporated at subatmospheric pressure. The mixture is cooled to room temperature and the deposited end product is filtered off. 115 parts (75% of the theory) of N-phenylpropyleneurea-N'-methylphosphonyl dichloride is obtained. Melting point: 130° to 145° C. with decomposition.

We claim:
1. A ureidomethylphosphonyl halide having the formula:

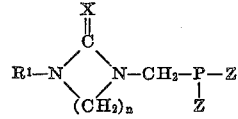

wherein the radical R¹ denotes an alkyl of 1 to 12 carbon atoms, a cycloalkyl of 5 to 7 carbon atoms, an aralkyl of 7 to 12 carbon atoms, phenyl or naphthyl, and $n$ is an integer of 2 or 3, and R¹ may also denote the radical:

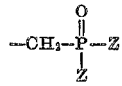

Z denoting a chlorine atom or a bromine atom, and X denoting an oxygen atom or a sulfur atom.

2. A ureidomethylphosphonyl halide as in claim 1 wherein $n$ is 2.

References Cited
UNITED STATES PATENTS 2,328,358  8/1943  Pikl _____ 260—500
2,304,157  8/1942  Engelmann et al. _____ 8—116

ALEX MAZEL, Primary Examiner

R. V. RUSH, Assistant Examiner

U.S. Cl. X.R.

106—15 FP; 260—309.7, 543 P